United States Patent
Liao

(10) Patent No.: US 8,438,278 B2
(45) Date of Patent: May 7, 2013

(54) METHODS FOR MONITORING AND REPORTING MTC EVENTS

(75) Inventor: Ching-Yu Liao, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 80 days.

(21) Appl. No.: 13/097,442

(22) Filed: Apr. 29, 2011

(65) Prior Publication Data

US 2011/0270973 A1 Nov. 3, 2011

Related U.S. Application Data

(60) Provisional application No. 61/330,566, filed on May 3, 2010.

(51) Int. Cl.
*G06F 15/173* (2006.01)
(52) U.S. Cl.
USPC .......................................... 709/224; 709/225
(58) Field of Classification Search ................... 709/224, 709/225
See application file for complete search history.

(56) References Cited

U.S. PATENT DOCUMENTS

| | | |
|---|---|---|
| 2006/0274703 A1 | 12/2006 | Connelly |
| 2011/0199905 A1* | 8/2011 | Pinheiro et al. ............... 370/235 |
| 2011/0201343 A1* | 8/2011 | Pinheiro et al. ............... 455/450 |
| 2012/0110145 A1* | 5/2012 | Pinheiro et al. ............... 709/220 |

FOREIGN PATENT DOCUMENTS

| | | |
|---|---|---|
| EP | 1 681 800 A1 | 7/2006 |
| WO | WO 00/51381 | 8/2000 |

OTHER PUBLICATIONS

3GPP TR 23.888V0.3.2(Mar. 2010); 3rd Generation Partnership Project; Technical Specification Group Services and System Aspects; System Improvements for Machine-Type Communications; (Release 10); pp. 1-33.

3GPP TS 22.368 V2.0.0 (Mar. 2010); 3rd Generation Partnership Project; Technical Specification Group Services and System Aspects; Service requirements for machine-type communications; Stage; (Release 10); pp. 1-22.

ETSI TS 123 401 v9.4.0 (Mar. 2010); LTE; General Packet Radio Service (GPRS) enhancements for Evolved Universal Terrestrial Radio Access Network (E-UTRAN) access (3GPP TS 23.401 version 9.4.0 Release 9); pp. 1-259.

* cited by examiner

*Primary Examiner* — Kristie Shingles
(74) *Attorney, Agent, or Firm* — Birch, Stewart, Kolasch & Birch, LLP

(57) ABSTRACT

MTC event monitoring methods and the network servers thereof. The MTC event monitoring method comprises configuring, by the network server, a detection sensitivity threshold, determining, by the network server, an MTC event at an MTC device and an associated detection sensitivity parameter, and reporting, by the network server, the MTC event to an MTC server only when the associated detection sensitivity parameter equals to or exceeds the detection sensitivity threshold.

14 Claims, 4 Drawing Sheets

METHODS FOR MONITORING AND REPORTING MTC EVENTS

CROSS REFERENCE TO RELATED APPLICATIONS

This application claims the benefit of U.S. Provisional Application No. 61/330,566, filed May 3, 2010, the entirety of which is incorporated by reference herein.

BACKGROUND OF THE INVENTION

1. Field of the Invention

The present invention relates to machine type communication (MTC), and in particular relates to methods for monitoring and reporting an MTC event.

2. Description of the Related Art

Machine Type Communication (MTC) is the communication between devices without human interaction or intervention. The MTC may include establishing a connection between a network server and an MTC device identified in an MTC subscription. The MTC subscription is provided by the network operator to an MTC user. The network server communicates with the MTC device to detect an MTC event based on the MTC subscription, so that a network action can be performed to the MTC device upon the detection of the MTC event. However, incorrect MTC events may arise due to erroneous detection. Thus, methods for monitoring and reporting the MTC event are in need, to reduce incorrect MTC event detection and decrease impact on the MTC network and MTC device upon detecting that the MTC event.

BRIEF SUMMARY OF THE INVENTION

A detailed description is given in the following embodiments with reference to the accompanying drawings.

An embodiment of an MTC event monitoring method in a network server is described, comprising
 a. configuring, by the network server, a detection sensitivity threshold,
 b. determining, by the network server, an MTC event at an MTC device and an associated detection sensitivity parameter, and
 c. reporting, by the network server, the MTC event to an MTC server only when the associated detection sensitivity parameter equals to or exceeds the detection sensitivity threshold.

Another embodiment of an MTC event monitoring method in a network server is disclosed, comprising
 a. being configured to monitor a first MTC event and a second MTC event,
 b. detecting, by the network server, the first MTC event and the second MTC event,
 c. checking, by the network server, if the second MTC event is detected when the first MTC event is detected, and
 d. reporting, by the network server, at least one of the first and second MTC events only when the first and second MTC events are detected.

Still another embodiment of an MTC event reporting method in a network server is revealed, comprising
 a. reporting, by the network server, the MTC event of an MTC device to an MTC server upon determination of the MTC event,
 b. receiving, by the network server, an MTC event response indicating that the MTC event has been resolved from the MTC server, and
 c. allocating, by the network server, a transmission resource to the MTC device according to the MTC event response.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. The 3GPP specifications are used to teach the spirit of the invention, and the invention is not limited thereto.

Figure 1:
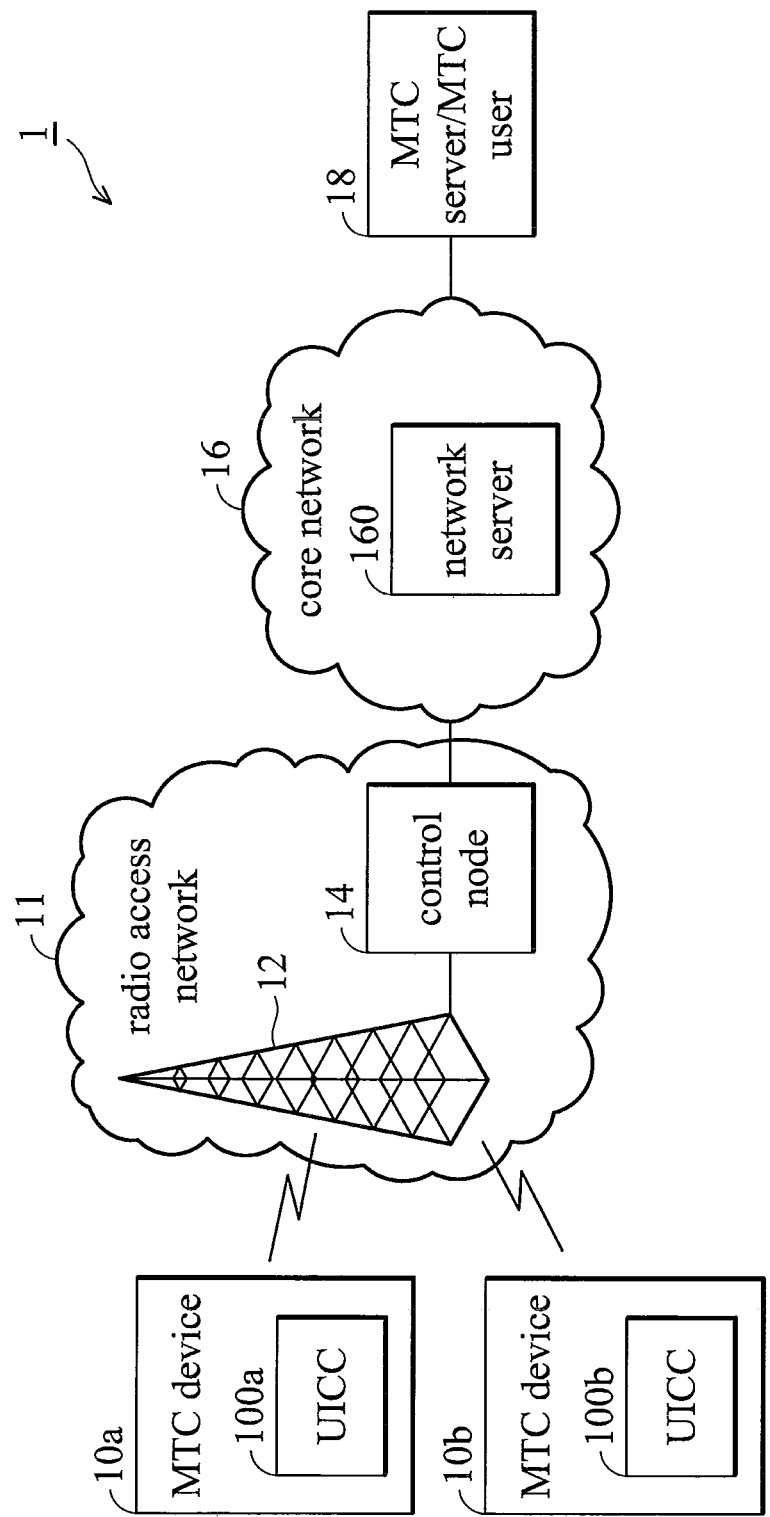
FIG. 1 is a system diagram of an exemplary telecommunication system 1 supporting machine type communication.

FIG. 1 is a system diagram of an exemplary telecommunication system 1 supporting machine type communication. The telecommunication system 1 comprises MTC devices 10a and 10b, a radio access network 11, a core network 16, and an MTC server/MTC user 18. The MTC devices 10a and 10b are wirelessly coupled to the radio access network 11, and the core network 16, subsequently to the MTC server/MTC user 18 through wired, wireless, or combinational connection. The radio access network 11 comprises base station 12 and a control node 14 coupled thereto. The MTC devices 10a and 10b are in communication with the base station 12 through radio channels therebetween. The MTC devices 10a and 10b are user equipments configured for the MTC, and may be handhold mobile phones, laptop equipped with broadband network adaptors, or any other device capable of communicating.

The base station 12 provides cell coverage area to serve telecommunication services to any mobile device therein. Although only one base station 12 is shown in the telecommunication system 1, it should be appreciated that more than one base station may be incorporated to provide the cell coverage area, and the base station 12 can serve more than one cell coverage area. The telecommunication service may include second, third, fourth generation telecommunication systems such as Global System for Mobile communications (GSM) system, Universal Mobile Telecommunications System (UMTS), and Long Term Evolution (LTE) system, etc.

The control node 14 may be a base station controller (BSC) in the GSM system, or a radio network controller (RNC) in the UMTS radio access network (UTRAN). The control node 14 may be a base station controller (BSC) in the GSM system, or a radio network controller (RNC) in the UMTS radio access network (UTRAN). The control node 14 controls operations of the base station 12 and provides access to the core network 16.

The core network 16 provides various services to mobile stations subscriber thereto through the access network. The core network 16 may be a public land mobile network (PLMN) that provides mobile communication services to the public. The core network 16 may comprise a network server 160 that serves to monitor and report MTC events in an MTC group of the MTC devices 10a and 10b. The network server 160 may be Serving GPRS Support Node/Mobility Management Entity (SGSN/MME), Gateway GPRS Support Node/Packet data network GateWay (GGSN/P-GW), PCRF, Home Location Register/Home Subscriber Server (HLR/HSS), or a combination thereof.

Although only two MTC devices are shown in the FIG. 1, it should be appreciated that more MTC devices may be incorporated in the MTC group.

An MTC subscriber is the MTC server/MTC user 18 that subscribes to one or more MTC service from a network operator to monitor the MTC devices in the MTC groups. The MTC server/MTC user 18 configures the MTC event that it is interested in monitoring at the network server 160. The network provider such as a GSM operator provides the MTC service by monitoring the corresponding MTC event in the MTC group of the MTC devices, such that when the corresponding MTC event occurs at one MTC device in the MTC group, the network provider can detect the corresponding MTC event and report to the MTC server/MTC user 18.

Although the MTC server and MTC user are bundled together in the FIG. 1, those skilled in the art should appreciate that the MTC server and the MTC user may be implemented at different locations. For example, the MTC server may be located at the core network 16. The MTC server has an interface accessible by the MTC user, performs service for the MTC user and communicates with the network server 160.

The MTC monitoring MTC feature comprises one or more of the following MTC event type, but not limited thereto:
1. Behavior not aligned with activated MTC features. The MTC features comprise time control, low mobility, small data transmission, etc, which are stored in the subscription of the MTC device in HSS/HLR. One of the MTC features is time control, where the MTC devices are informed or randomly choose a grant time interval or a communication window, and the MTC devices are forbidden to access the core network 16 outside of the grant time interval or the communication window. In one example, the MTC user/MTC server 18 activates the MTC feature of time control for the MTC group in the network server 160 such as the HLR/HSS. When the MTC device in the MTC group accesses the core network 16 outside of the grant time interval, the MTC event is triggered, and the HLR/HSS 160 reports the MTC event as the behavior is not aligned with the activated time control MTC feature.
2. Change in the point of attachment. The MTC devices in each MTC group are defined by predetermined points of attachment. The predetermined point of attachment can be set up by the MTC user 18 at the network server 160 to define an area that the MTC device 10a or 10b can move therein. A MTC feature of low mobility may be activated for the MTC devices. When the MTC device leaves the predetermined point of attachment, the network server 160 can detect the change in the point of attachment and inform the MTC event to the MTC server/MTC user 18.
3. Change of the association between the MTC device and a Universal Integrated Circuit Card (UICC). The UICC is a smart card inserted in mobile stations 10a and 10b in a third generation RAT network such as UMTS or any other RAT network in use. The UICC ensures the integrity and security of all kinds of personal data at the MTC devices 10a and 10b. The UICC comprises an international mobile subscriber ID (IMSI) and an international mobile equipment ID (IMEI). The network server 160 may be the HLR/HSS that keeps a record of the IMSI and IMEI of the UICC in the MTC device, such that when the MTC device 10a or 10b changes the association with the UICC thereof, the HLR/HSS 160 reports the MTC event to the MTC server/MTC user 18.
4. Loss of connectivity. When it is no longer possible to establish signaling between the MTC device 10a or 10b and the network server 160, the network server 16 determines a loss of connectivity to the MTC device thereof and reports the MTC event to the MTC server/MTC user 18.

Figure 2:
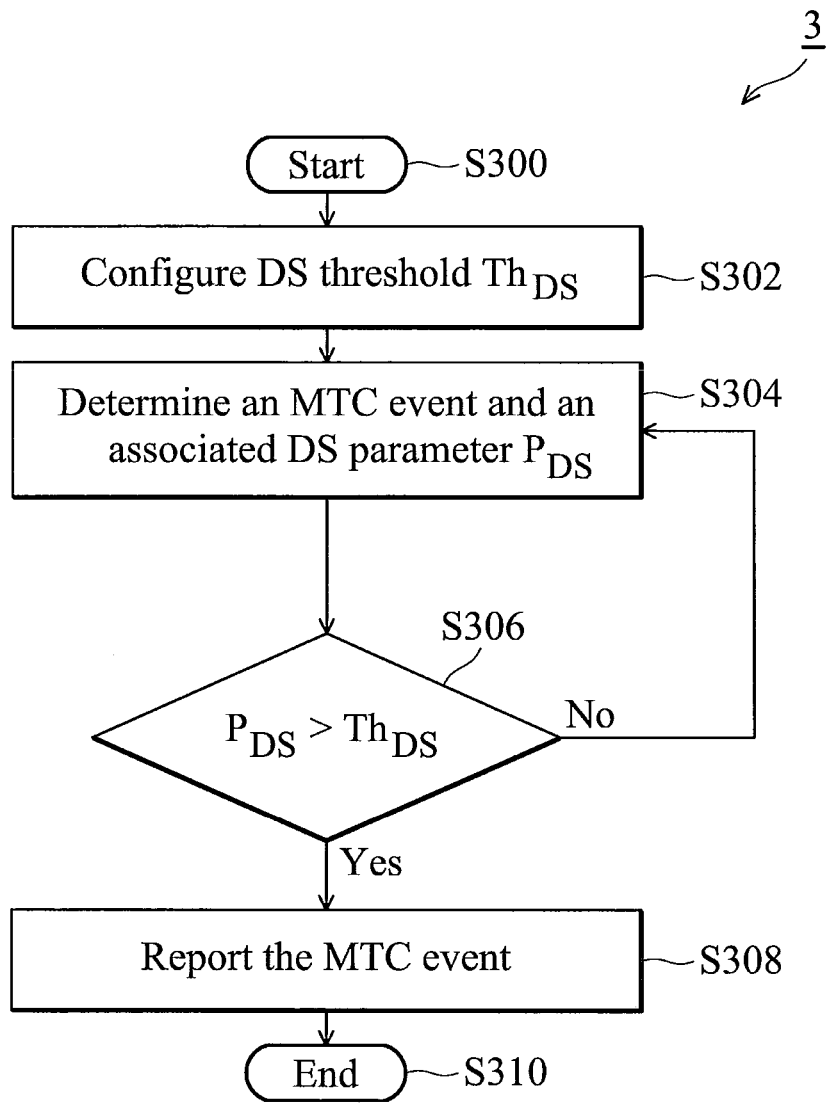
FIG. 2 is a flowchart of an exemplary MTC event monitoring method 3 according to the invention.

FIG. 2 is a flowchart of an exemplary MTC event monitoring method 3 according to the invention, incorporating the network server 160 in FIG. 1.

In Step S300, the network server 160 is initiated to monitor any configured MTC event at one or more MTC devices in an MTC group according to the MTC event monitoring method 3. The network operator/MTC server/MTC user 18 configures one or more MTC events to be monitored during initiation in Step S300, where the configured MTC event is of different MTC event type.

In Step S302, a detection sensitivity (DS) threshold $Th_{DS}$ at the network server 160 is configured by the network operator, the MTC server, or the MTC user. The DS threshold $Th_{DS}$ may be associated with a time, a distance, a number of occurrences, or a probability. The higher the DS threshold $Th_{DS}$ is, the less sensitive it is for the network server 160 to detect an MTC event. The measure unit of the DS threshold $Th_{DS}$ may be fixed or configurable by the network operator or the MTC server/MTC user 18.

For example, the MTC user 18 can configure the network server 160 to detect any behavior not aligned with an activated time controlled MTC feature and set up a first DS threshold $Th_{DS}$ to 4 time units representing the difference of time duration between the transmission duration and allocated grant transmission duration, wherein the time unit thereof is defined by the network operator. The network server 160 performs specific actions if the network server 160 detects the event with difference of time duration larger than or equal to 4 time units. Examples of the MTC features include time control, low mobility, small data transmission, etc, which are stored in the subscription of the MTC device in HSS/HLR.

The configured DS threshold $Th_{DS}$ can be stored in a register or memory unit in the network server 160. The Network operator, the MTC server, or the MTC user can configure specific DS thresholds $Th_{DS}$ corresponding to MTC events to be detected. The DS thresholds $Th_{DS}$ for any MTC event may be the same for all MTC devices in any MTC group.

In Step S304, the network server 160 determines the MTC event in the MTC device and an associated DS parameter $P_{DS}$. The associated DS parameter $P_{DS}$ has the same data type and measure unit as the DS threshold $Th_{DS}$. Therefore the associated DS parameter $P_{DS}$ may also be associated with a time, a distance, a number of occurrences, or a probability. For example, the network server 160 receives uplink transmission from the MTC device 10a outside of the grant time interval for 1 time unit, thus, the network server 160 determines the MTC event as the behavior is not aligned with the activated time control MTC feature. If this is the very first detected MTC event upon startup of the method 3, the associated DS parameter $P_{DS}$ is set as 1 time unit. Otherwise the $P_{DS}$ is incremented by 1 ($P_{DS}+1$). The associated DS parameter $P_{DS}$ is reset to zero when no MTC event is identified in a time interval of one time unit.

In Step S306, the network server 160 compares the associated DS parameter $P_{DS}$ with the DS threshold $Th_{DS}$ to determine whether the associated DS parameter $P_{DS}$ equals to or exceeds the DS threshold $Th_{DS}$. If so, the MTC event monitoring method 3 continues on step S308, and returns to step S304 if otherwise. If the associated DS parameter $P_{DS}$ is less than or equal to the DS threshold $Th_{DS}$, the detected MTC event is not affirmative enough to be considered as a confirmed MTC event, thus the MTC event monitoring method 3 returns to steps S304 and continues monitoring the MTC event and the associated DS parameter $P_{DS}$ until the associated DS parameter $P_{DS}$ equals to or exceeds the DS threshold $Th_{DS}$ and the MTC event is confirmed.

In Step S308, the network server 160 reports the MTC event to the MTC server/MTC user 18. When the associated DS parameter $P_{DS}$ equals to or exceeds the DS threshold $Th_{DS}$, the network server 160 determines that the detected MTC event is a confirmed event and reports the MTC event to the MTC user through the MTC server. The MTC event report may comprise the MTC device, the detected MTC event thereof, and the associated DS parameter $P_{DS}$. The MTC event report may further comprise a notification informing vandalism or theft of the MTC device.

In response, the MTC user can take an action to remove or correct the MTC event in the MTC device. The network server 160 may reduce the transmission resource allocated to the MTC device according to the associated DS parameter $P_{DS}$. The transmission resource may comprise the grant time interval, communication window, and bandwidth for data transmission, etc. The network server 160 may reduce the allocated transmission resource with increasing value of the associated DS parameter $P_{DS}$. The network server 160 may also allocate no transmission resource to the MTC device when the associated DS parameter $P_{DS}$ equals to or exceeds the DS threshold $Th_{DS}$.

In Step S310, the MTC event monitoring method 3 is complete and exited. The network server 160 may also perform one or more MTC event detection according to the MTC event monitoring method 3 concurrently or separately.

In one example, the DS threshold $Th_{DS}$ is a time difference between the grant time interval and a transmission duration threshold, and the associated DS parameter $P_{DS}$ is a time difference between the grant time interval and detected transmission duration. In Step S300, the MTC server/MTC user 18 subscribes a MTC feature of time controlled, the network operator/MTC server/MTC user 18 configures the network server 160 to monitor any behavior not aligned with the time controlled MTC feature at the MTC devices in the MTC group. Examples of the MTC features include time controlled, low mobility, small data transmission, etc, which are stored in the subscription of the MTC device in HSS/HLR. The network operator/MTC server/MTC user 18 sets the DS threshold $Th_{DS}$ at the network server 160 (S302). Upon detecting that the transmission duration for a data transmission of the MTC device equals to or exceeds the grant time interval, the network server 160 determines that the DS parameter $P_{DS}$ is associated with the MTC event according to the detected transmission duration (S304), and compares the associated DS parameter $P_{DS}$ with the DS threshold $Th_{DS}$ (S306). When the DS threshold $Th_{DS}$ is 0, the network server 160 reports the MTC event to the MTC server/MTC user 18 whenever detecting that the MTC event is not aligned with the time controlled MTC feature (S308). When the DS threshold $Th_{DS}$ is 4, the network server 160 reports the MTC event to the MTC server/MTC user 18 when the time difference between the grant time interval and detected transmission duration is equal to or exceeded by 4 time units (S308).

In another example, the DS threshold $Th_{DS}$ is a distance difference between the predetermined area (points of attachment) and an area threshold, and the associated DS parameter $P_{DS}$ is a distance difference between the predetermined area and a current location of the MTC device. The HLR/HSS holds information representing the predetermined area. The information may comprise allowed points of attachment of the MTC device. The allowed points of attachment and the current location may be indicated by tracking area indexes (TAI). The network operator/MTC server/MTC user 18 configures the network server 160 to monitor the current location (point of the attachment) for the MTC devices in the MTC group (S300). The network server 160 may be a SGSN/MME, a HLR/HSS, or both. The network operator/MTC server/MTC user 18 sets the DS threshold $Th_{DS}$ at the network server 160 (S302). Upon detecting that the MTC device at the current location equals to or exceeds the predetermined area, the SGSN/MME 2 determines that the DS parameter $P_{DS}$ is associated with the MTC event according to the current location (S304), and compares the associated DS parameter $P_{DS}$ with the DS threshold $Th_{DS}$ (S306). When the DS threshold $Th_{DS}$ is 0, the network server 160 reports the MTC event to the MTC server/MTC user 18 whenever detecting that the current location is equal to or exceeds the predetermined area (S308). When the DS threshold $Th_{DS}$ is 10, the network server 160 reports the MTC event when the distance difference between the predetermined area and a current location of the MTC device equals to or exceeds 10 distance units (S308). As a consequence, the MTC device is allowed to attach to a neighboring SGSN/MME exceeding the predetermined points of attachment. The distance unit can be fixed or configurable by the network operator/MTC server/MTC user, and may be, for example, 10 meter.

In still another example, the DS threshold $Th_{DS}$ is a number of occurrences of an MTC event. The network operator/MTC server/MTC user 18 configures the network server 160 to monitor the event of loss of connectivity at the MTC device. The network operator/MTC server/MTC user 18 sets the DS threshold $Th_{DS}$ at the network server 160 (S302). Upon detecting a loss of connectivity to the MTC device, the network server 160 determines the DS parameter $P_{DS}$ associated with the MTC event according to the number of times the connectivity is lost (S304), and compares the associated DS parameter $P_{DS}$ with the DS threshold $Th_{DS}$ (S306). When the DS threshold $Th_{DS}$ is 1, the network server 160 reports the MTC event to the MTC server/MTC user 18 whenever detecting the loss of the connectivity to the MTC device (S308). When the DS threshold $Th_{DS}$ is 4, the network server 160 reports the MTC event to the MTC server/MTC user 18 when the connectivity to the MTC is lost for 4 or more times (S308). The maximum number of occurrences of the DS threshold $Th_{DS}$ is fixed or configurable by the network operator or the MTC server/user.

In yet another example, the DS threshold $Th_{DS}$ is time duration of an MTC event. The MTC server/MTC user 18 configures the network server 160 to monitor any loss of connectivity at the MTC device. The network operator/MTC server/MTC user 18 sets the DS threshold $Th_{DS}$ at the network server 160 (S302). Upon detecting a loss of connectivity to the MTC device, the network server 160 determines the DS parameter $P_{DS}$ associated with the MTC event according to the time duration of the lost connectivity to the MTC device (S304), and compares the associated DS parameter $P_{DS}$ with the DS threshold $Th_{DS}$ (S306). When the DS threshold $Th_{DS}$ is 1, the network server 160 reports the MTC event to the MTC server/MTC user 18 whenever detecting that the loss of the connectivity to the MTC device has occurred for longer than 1 time unit (S308). When the DS threshold $Th_{DS}$ is 4, the network server 160 reports the MTC event when the connectivity to the MTC is lost for longer than 4 time units (S308). The time unit may be 10 minutes, and is fixed or configurable by the network operator or the MTC server/user.

The MTC event monitoring method 3 employs the detection sensitivity threshold to reduce incorrect MTC event detection, and increase reliability of the MTC event determination.

Figure 3:
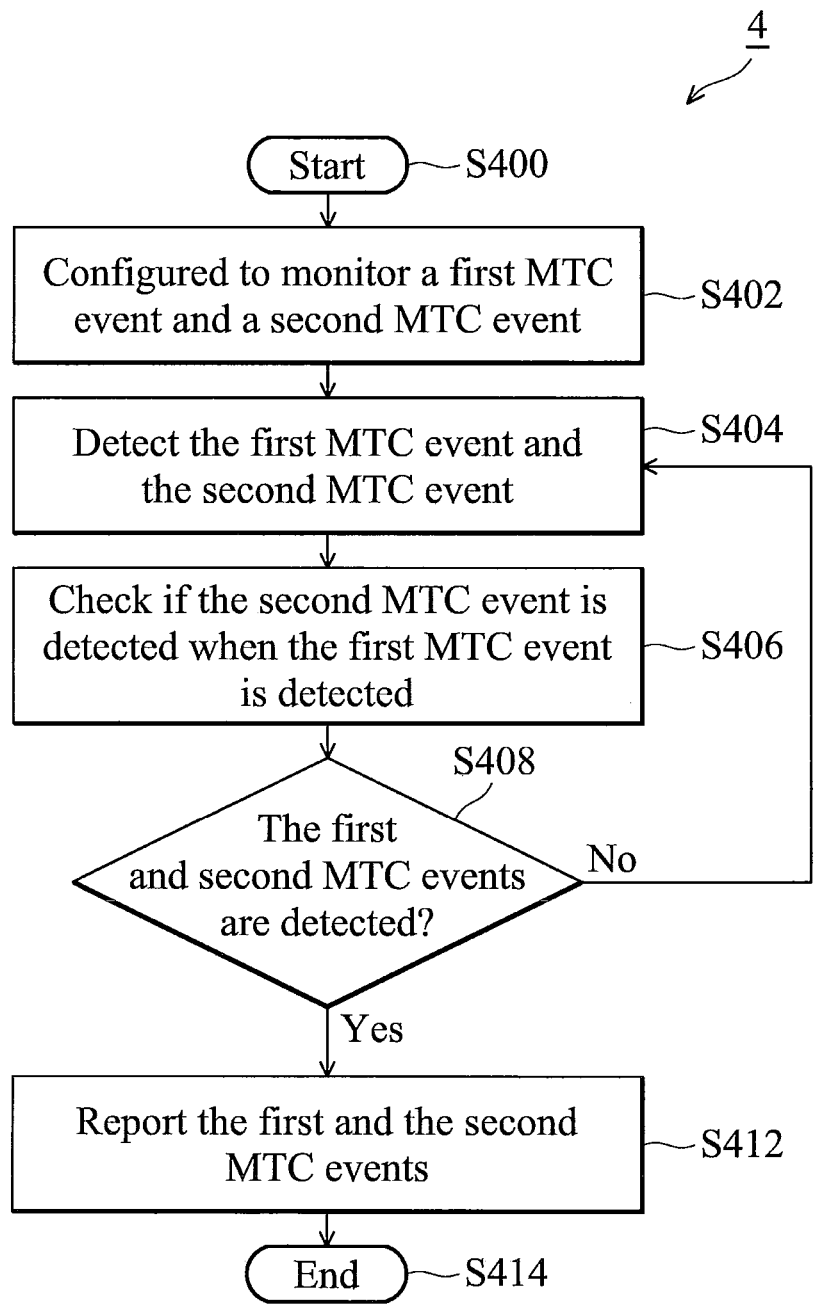
FIG. 3 is a flowchart of an exemplary MTC event monitoring method 4 according to the invention.

FIG. 3 is a flowchart of an exemplary MTC event monitoring method 4 according to the invention, incorporating the network server 160 in FIG. 1.

In Step S400, the network server 160 is initiated to monitor two or more MTC events at one or more MTC devices according to the MTC event monitoring method 4. The network server 160 may be a SGSN/MME, a GGSN/P-GW, a PCRF, or HLR/HSS, or a combination thereof. The MTC event monitoring method 4 employs multiple MTC events to reduce incorrect MTC event detection and increase reliability of MTC event determination.

In Step S402, the network server 160 are configured to monitor a first MTC event and a second MTC event sequentially or in parallel. The first and second MTC events are either of different event types occurred at the same MTC device, or of the same event type occurred at different MTC devices within a MTC group.

In Step S404, the network server 160 detects the first MTC event and the second MTC event configured in Step S402. If the first MTC event is detected, since any single MTC event may be detected due to a random accident or erroneous determination, the network server 160 withholds the MTC event report for the first MTC event and in Step S406, proceeds to check if the second MTC event is detected. Since the second MTC event may be correlated to the first one, when the first and second MTC events are both detected, the first MTC event is more probable to happen, than if just the first MTC event is detected. Thus, in Step 408, it is determined whether the first and second MTC events are both detected. If so, the MTC event monitoring method 4 continues on to Step S412, and if otherwise the method 4 returns to Step S404 to continuously detect the second MTC event.

In Step S412, the network server 160 reports the first and the second MTC events. When both the first and second MTC events are detected concurrently or consecutively, the network server 160 determines that both MTC events are correct and reports both MTC events to the MTC server/MTC user 18. The network server 160 may reduce transmission resources allocated to the first or second MTC device when both the first and second MTC events are detected concurrently or consecutively.

In Step S414, the MTC event monitoring method 4 is complete and exited. Please note that the detection sensitivity threshold and parameter used in the MTC event monitoring method 3 can also be applied in the MTC event monitoring method 4, so as to increase the reliability and accuracy of the MTC event monitoring method 4. For example, when it is determined that the first and second MTC events are not both detected in Step S408, the method 4 will return to Step S404. If another first MTC event is detected, then the detection sensitivity threshold and parameter (e.g. the number of occurrence) can be introduced here to reduce incorrect MTC event detection and increase reliability of the MTC event monitoring method 4.

In one embodiment of the MTC event monitoring method 4, the first and second MTC events are of different event types occurred at the same MTC device. Based on the subscribed MTC monitoring feature, the network operator/MTC server/MTC user 18 configures two or more MTC event types to be monitored during the initiation of the MTC event monitoring method 4. For instance, the network server 160 detects a loss of connectivity from an MTC device as the first MTC event (S404). The network sever 160 is then triggered to check if the second MTC event is detected on the same MTC device (S406). The type of the second MTC event is different from that of the first MTC event, and may be, for example, a change in the point of the attachment. Next, the network server 160 determines whether the first and second MTC events have both occurred (S408). If so, the network server 160 reports both the first and second MTC events to the MTC server/MTC user 18 (S412), and the method 4 is exited (S414). If not, the network server 160 returns to Step 406 to continuously check if the second MTC event is detected. It should be noted that people skilled in the art can easily extend this embodiment to the case where more than two correlated MTC event types are monitored.

In another embodiment of the MTC event monitoring method 4, the first and second MTC events are of the same event type occurred at different MTC devices within a MTC group. For instance, the network server 160 detects a loss of connectivity from a first MTC device as the first MTC event (S404). Subsequently, the network sever 160 checks if the second MTC event of a loss of connectivity is detected in a second MTC device (S406). The first and second MTC devices belong to the same MTC group. Next, the network server 160 determines whether the first and second MTC events have both occurred (S408). If so, the network server 160 reports both the first and second MTC events to the MTC server/MTC user 18 (S412), and the method 4 is exited (S414). If not, the network server 160 returns to Step 406 to continuously check if the second MTC event is detected. It should be noted that people skilled in the art can easily extend this another embodiment to the case where a MTC group including more than two MTC devices are monitored if a certain type of MTC event occurs. Alternatively, if this another embodiment is applied to a MTC group including more than two MTC devices, the number of occurrence of the detected MTC events can be introduced to Step S408 to help evaluate the false alarm probability. That is, the higher the number of occurrence is, the lower the false alarm probability becomes. Before reporting at Step 412, the Step 404 to Step 408 are repeated until the network server 160 guarantees that the evaluated false alarm probability is lower than the pre-configured false alarm probability, which is configured by the network operator/MTC server/MTC user.

Figure 4:
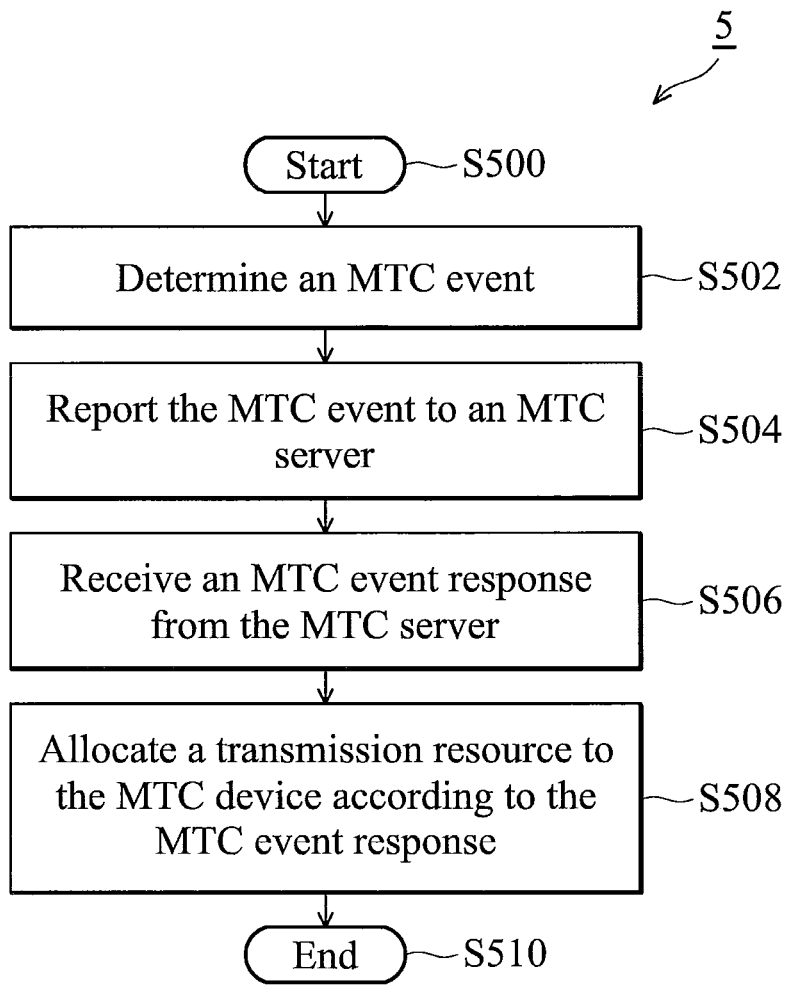
FIG. 4 is a flowchart of an exemplary MTC event reporting method 5 according to the invention.

FIG. 4 is a flowchart of an exemplary MTC event reporting method 5 according to the invention, incorporating the network server 160 in FIG. 1.

In Step S500, the network server 160 is initiated to report a configured MTC event to an MTC server/MTC user according to the MTC event monitoring method 5. The network server may be a SGSN/MME, a GGSN/P-GW, a PCRF, HLR/HSS server, or a combination thereof. The network operator/MTC server/MTC user 18 configures the MTC event to be monitored during the initiation in Step S500. The configured MTC event comprises one or more MTC event types.

In Step S502, the network server 160 determines that an MTC event has occurred at the MTC device. For example, the network server 160 determines the MTC device has loss connectivity thereof. The determined MTC event may be recorded at the memory module 24.

Next In Step S504, in response to the MTC event detection, the network server 160 reports the MTC event to the MTC server/MTC user 18. The network server 160 reports the MTC event. The network server 160 transmits a notification message comprising a cause value corresponding to a type of the MTC event. In one embodiment, the cause value is hexadecimal, the MTC event "change in the point of attachment" is indicated by H '2', and the MTC event "loss of connectivity" is indicated by H '3'. Upon receipt of the notification message, the MTC server/MTC user 18 may confirm or resolve the MTC event accordingly. For example, the MTC user 18 may send an employee to check and correct the MTC event.

In Step S506, the network server 160 receives an MTC event response from the MTC server/MTC user 18. After confirming or correcting the MTC event, the MTC server/MTC user 18 sends the MTC event response informing that the reported MTC event has been confirmed, resolved, or cleared.

In Step S508, the network server 160 allocates a transmission resource to the MTC device according to the MTC event response. When the MTC event response indicates that the MTC event has been resolved or cleared, the network server 160 resets all MTC events. When the MTC event response indicates that the MTC event has been confirmed, the network server 160 reduces the transmission resources allocated to the MTC device. The reduction in the transmission resources may be configured by the network operator/MTC server/MTC user 18 in a configured quantization level.

In one example, if time controlled MTC feature is activated, the transmission resource comprises the grant time interval, transmission rate, or transmission bandwidth, etc. When the MTC event response indicates that the MTC event at the MTC device has been confirmed, the network server 160 reduces the grant time interval for the MTC device by a half thereof. When the MTC event response indicates that another MTC event at the MTC device has been confirmed, the network server 160 reduces the grant time interval for the MTC device by another half thereof. The HLR/HSS may comprise an MTC event response limit accessible by the network server 160. When the network server 160 receives a number of MTC event responses which are equal to or exceed the MTC event response limit, the MTC device will no longer receive any transmission resources from the network.

In Step S510, the MTC event reporting method 5 is complete and exited.

The MTC event reporting method 5 utilizes the MTC event response from the MTC server/MTC user to confirm the MTC event, thus the network server 160 can take network action to the MTC device according to the MTC event response, resulting in decreased impact on the MTC network.

The MTC event method 3, 4, and 5 can be utilized separately or conjointly by the network server 160, those who skilled in the art can adapt the methods described herein without deviation from to the principle of the invention to meet their own preference of MTC event methods.

As used herein, the term "determining" encompasses calculating, computing, processing, deriving, investigating, looking up (e.g., looking up in a table, a database or another data structure), ascertaining and the like. Also, "determining" may include resolving, detecting, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An MTC (Machine Type Communication) event monitoring method in a network server, comprising:
configuring, by the network server, a detection sensitivity threshold;
determining, by the network server, an MTC event at an MTC device has occurred;
determining, by the network server, an associated detection sensitivity parameter based on the MTC event;
reporting, by the network server, the MTC event to an MTC server only when the associated detection sensitivity parameter equals to or exceeds the detection sensitivity threshold; and
reducing a transmission resource allocated to the MTC device with an increasing associated detection sensitivity parameter upon determining the MTC event.

2. The MTC event monitoring method as claimed in claim 1, wherein:
the detection sensitivity threshold and the associated detection sensitivity parameter are associated with time.

3. The MTC event monitoring method as claimed in claim 1, wherein:
the detection sensitivity threshold and the associated detection sensitivity parameter are associated with distance.

4. The MTC event monitoring method as claimed in claim 1, wherein:
the detection sensitivity threshold and the associated detection sensitivity parameter are associated with a number of occurrence.

5. The MTC event monitoring method as claimed in claim 1, wherein:
the detection sensitivity threshold and the associated detection sensitivity parameter are associated with a probability.

6. The MTC event monitoring method as claimed in claim 1, wherein the network server is a SGSN/MME, a GGSN/P-GW, a PCRF, HLR/HSS, an MTC client, or an MTC server.

7. An MTC event monitoring method in a network server, comprising: being configured to monitor a first MTC event at a first MTC device and a second MTC event at a second MTC device;
detecting, by the network server, the first MTC event and the second MTC event;
checking, by the network server, if the second MTC event is detected when the first MTC event is detected;
reporting, by the network server, at least one of the first and second MTC events only when the first and second MTC events are detected; and
reducing, by the network server, a transmission resource allocated to the first MTC device and the second MTC device when the first and second MTC events are detected.

8. The MTC event monitoring method of claim 7, wherein: the first MTC device is the second MTC device;
wherein the first MTC event and the second MTC event are of different MTC event types.

9. The MTC event monitoring method of claim 7, wherein: the first MTC device is different from the second MTC device;
   wherein the first MTC event and the second MTC event are of a same MTC event type.

10. The MTC event monitoring method as claimed in claim 7, wherein the network server is a SGSN/MME, a GGSN/P-GW, a PCRF, an HLR/HSS, or a combination thereof.

11. An MTC event reporting method in a network server, comprising:
   reporting, by the network server, the MTC event of an MTC device to an MTC server upon determination of the MTC event;
   receiving, by the network server, an MTC event response indicating that the MTC event has been resolved from the MTC server;
   allocating, by the network server, a transmission resource to the MTC device according to the MTC event response; and
   reducing, by the network server, a transmission resource allocated to the MTC device when the MTC event response confirms the MTC event.

12. The MTC event reporting method a claimed in claim 11, wherein the reporting step comprises:
   transmitting a notification message comprising a cause value corresponding to a type of the MTC event.

13. The MTC event reporting method as claimed in claim 11, wherein the network server is a SGSN/MME, a GGSN/P-GW, a PCRF, an HLR/HSS, or a combination thereof.

14. The MTC event repotting method as claimed in claim 11, further comprising:
   resetting, by the network server, the MTC event when the MTC event response indicates that the MTC event has been resolved.

* * * * *